March 17, 1942.   G. M. MAGRUM   2,276,406
HYDRAULIC SHOCK ABSORBER PACKING AND SEALING MEANS
Filed Sept. 9, 1940   2 Sheets-Sheet 1
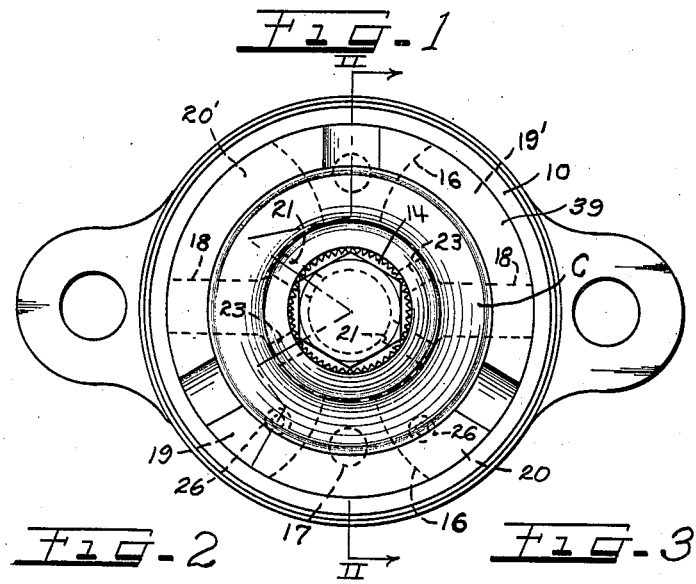
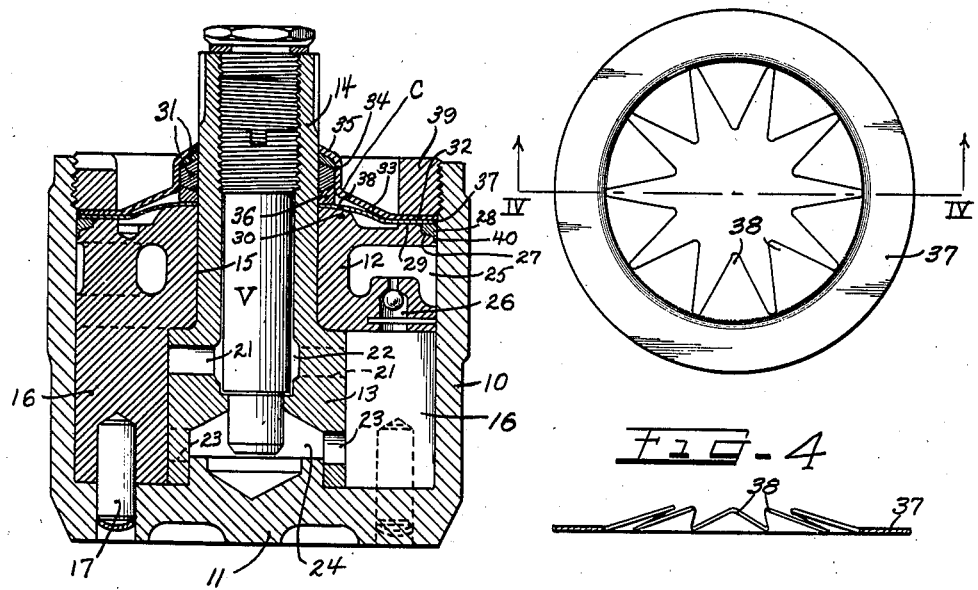
Inventor
Gervase M. Magrum.

March 17, 1942.  G. M. MAGRUM  2,276,406
HYDRAULIC SHOCK ABSORBER PACKING AND SEALING MEANS
Filed Sept. 9, 1940  2 Sheets—Sheet 2
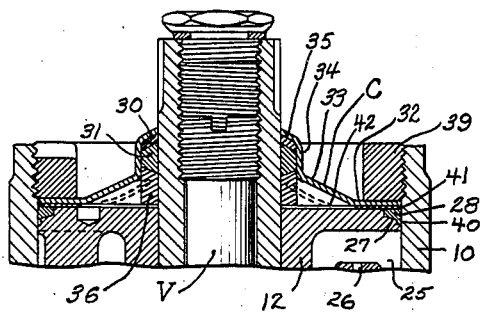
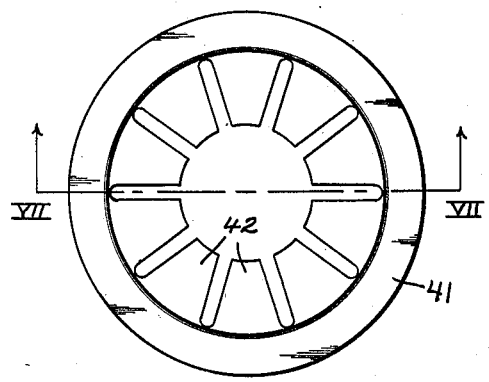
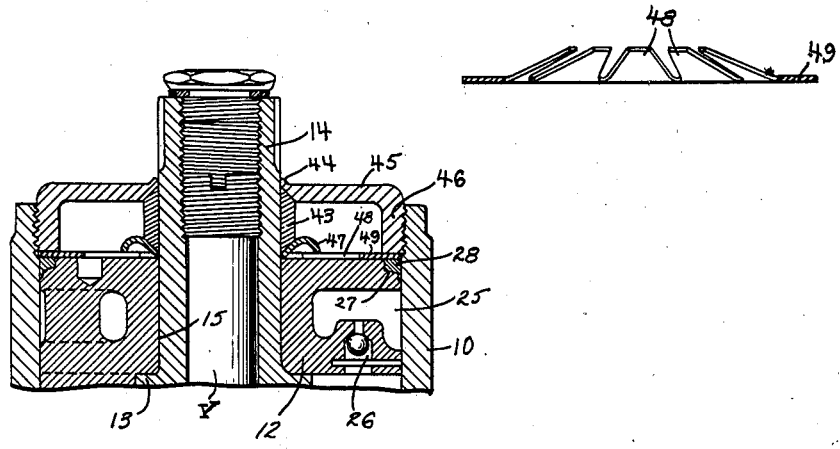
Inventor
Gervase M. Magrum.

Patented Mar. 17, 1942

2,276,406

UNITED STATES PATENT OFFICE 2,276,406

HYDRAULIC SHOCK ABSORBER PACKING AND SEALING MEANS

Gervase M. Magrum, Buffalo, N. Y., assignor to Houde Engineering Corporation, Buffalo, N. Y., a corporation of New York Application September 9, 1940, Serial No. 355,880

3 Claims. (Cl. 286—30)

My invention relates to hydraulic shock absorbers or analogous hydraulic structures in which hydraulic fluid is subjected to displacement under pressure by operation in the cylinder of piston structure whose driving shaft extends outwardly through a bearing wall which forms part of the cylinder structure. In hydraulic devices of this type it is important to prevent leakage of the hydraulic fluid outwardly between the piston driving shaft and its bearing walls, and it is also important to prevent leakage outwardly between the cylindrical wall of the cylinder structure and removable closure walls in engagement therewith.

The important object of the invention is therefore, in hydraulic devices of the type referred to, to provide improved, simplified and more efficient packing and sealing means for preventing leakage.

The various features of my invention are embodied in the structure disclosed on the drawings, in which drawings:

Figure 1 is an end view of a hydraulic shock absorber to which my invention is applied;

Figure 2 is a section of plane II—II of Figure 1;

Figure 3 is a plan view of a packing pressing and take-up disc spring such as shown on Figure 2;

Figure 4 is a section on plane IV—IV of Figure 3;

Figure 5 is a section like Figure 2 showing only part of the shock absorber and with the shape of the closure wall slightly modified;

Figure 6 is a plan view of the packing spring such as shown on Figure 5;

Figure 7 is a section on plane VII—VII of Figure 6; and

Figure 8 is a view like Figure 5 showing a modified packing arrangement.

The shock absorber shown comprises the cylindrical housing or casing 10 having the base 11. Fitting into the open end of the housing is the closure or end wall 12 which, with the cylindrical housing wall 10 and the base 11, defines a cylindrical space in which is the hub 13 of a piston structure whose shaft 14 extends through the bearing opening 15 through the wall 12.

Extending into the cylinder space from diametrically opposite sides of the wall 12 are the abutments 16 which receive pins 17 extending upwardly from the base 11 for securing the abutment and the wall 12 against rotation or displacement. The piston structure hub 13 has diametrically opposite radially extending vanes 18 which operate between the abutments during operation of the piston structure in the housing, the abutments together with the vanes and the piston structure hub defining the hydraulic working chambers 19, 19' and 20, 20'. Passageways 21 connect the working chambers 19 and 19' with a valve chamber 22 in the piston structure, and passageways 23 connect the working chambers 20 and 20' with the space 24 in the lower end of the piston structure; a suitable valve structure V being interposed between the chambers 22 and 24 for regulating the resistance to the flow of the hydraulic fluid between the working chambers when the piston structure is operating.

The wall 12 is cored out to provide a reservoir 25 for replenishing the working chambers through check valve control passages 26, the cylindrical wall of the housing forming the annular or surrounding wall for the reservoir space.

At its upper outer corner, the wall 12 is cut away to provide the annular groove 27 for receiving a gasket or sealing ring 28 of suitable material such as rubber for preventing escape of fluid between the wall 12 and the cylinder wall 10. In the arrangement shown on Figures 1 and 2, the wall 12, just inside of the sealing groove 27 has the annular seating boss 29, and an inner annular boss 30 on the wall 12 surrounds the shaft 14.

Outwardly of the boss 30, the shaft is surrounded by a packing assembly built up of sealing members 31 which are held in place by a retaining cover structure C of sheet metal. This cover structure is annular and comprises the annular flat peripheral portion 32, intermediate outwardly inclined portion 33, the cylindrical portion 34 extending outwardly from the portion 33, and the outwardly inclined end portion 35 which is apertured to receive the shaft 14. The parts 34 and 35 of the cover structure form a container for the packing 31, and engaging in the inner end of the container between the portion 34 thereof and the shaft is a retainer ring 36 preferably of metal. The outer wall of the retainer ring is inclined in a direction opposite to that of the inclination of the end 35 of the cover structure so that outer pressure of the ring against the packing will compress and urge the packing toward the shaft to maintain intimate sealing engagement therewith.

Spring means are provided for exerting pressure against the retainer ring for urging it at all times against the packing. Referring to Figures 1 to 4, the spring means is in the form of an annular disc 37 of spring steel having the radially inwardly extending triangular teeth or fingers 38 which extend normally at an angle with the disc flat outer portion. Before the packing material and the cover C are applied, the spring disc is slipped over the shaft for seating engagement of its flat outer portion on the seating boss 29, and with the inner ends of the spring teeth surrounding the shaft. The retaining ring, the packing and the cover C are now applied, and then a lock ring 39, in the form of an annular nut, is screwed into the end of the cylinder wall 10 to abut against the outer portion 32 of the cover C so as to clamp the cover and the spring disc against the wall 12, with the outer flat portion of the spring disc overlying the sealing ring 28 in the channel 27. This lock ring also serves to hold the wall 12 with its abutments 16 in axial position in the cylinder housing.

When the cover C is thus clamped into position, the retaining ring 36 will engage with the spring fingers 38 and will flex them so as to store spring energy therein, and then these spring fingers will at all times exert outward pressure against the retainer ring for movement of this ring to take up any wear in the packing 31 and to keep this packing in intimate sealing engagement with the shaft. The pressure of the locking ring will also cause compression of the sealing ring 28, the bottom of the channel 27 being inclined so that the sealing ring will be urged into intimate sealing engagement with the retaining walls around the channel and the cylinder wall 10. A narrow annular spill groove 40 is a continuation of the groove 27 so that sealing material in excess of that sufficient to fill the groove 27 when under compression may move into the spill groove.

The annular boss 30 on the wall 12 surrounding the shaft 14 serves to limit the flexure of the spring fingers 38 when the packing assembly and cover C are assembled, the boss being of such height that when the lock nut 39 is drawn up tight to clamp the cover C, the retainer ring will be shifted outwardly a distance for a primary compression and setting of the packing assembly in sealing engagement with the shaft. The spring fingers will then urge the retainer ring outwardly for taking up any slack in the packing assembly.

In the modified arrangements on Figures 5, 6 and 7, the shock absorber is the same except that the outer face of the wall 12 is all in a common radial plane. The spring disc 41 has the teeth or fingers 42 of trapezoidal shape which are normally inclined as shown on Figure 7. When the packing assembly and the cover C are clamped into position upon application of the lock nut 39, the spring fingers will be deflected against the wall 12 and then during service of the shock absorber they will exert spring pressure against the retaining ring 36 to urge this ring outwardly against the packing assembly to hold the packing intimately against the shaft.

Another modified is shown on Figure 8. Instead of employing a built-up packing assembly around the shaft of comparatively soft material which will require a retaining wall for holding it in radial alignment, a more rigid packing unit of molded construction may be employed which will hold its shape and will not require a diammetrical backing or support. Referring to Figure 8, the unitary packing ring or sleeve 43 has its outer and inner edges inclined, its outer edge being engaged by the correspondingly inclined end 44 of a cover structure 45 which may have integral therewith the threaded locking ring or flange 46 which threads into the end of the cylinder structure wall 10. The lower beveled edge of the packing ring is engaged by the inclined inner side of an annular retaining or pressure ring 47 of convex cross-section which is engaged at its outer end by the spring fingers 48 of a spring disc 49 which is clamped along its outer portion against the wall 12 by the locking ring 46. The outward pressure of the spring fingers 48 will urge the retainer ring 47 outwardly for the exertion of axial pressure against the packing ring 43 to hold this ring intimately against the shaft and with its upper beveled edge against the inclined end 44 of the cover 45. With the cover arrangement shown, an annular space 50 is provided which may function as a fluid reservoir.

I thus provide simple, economically manufactured and installed packing and sealing arrangement for hydraulic devices of the type described, the shaft packing being under a constant adjustment by the spring pressure thereagainst so that it will maintain intimate sealing engagement with the shaft to prevent leakage. Disc springs of various types and spring characteristics may be used depending upon the service required.

I have shown practical and efficient embodiment of my invention but I do not desire to be limited to the exact construction, arrangement and operation shown or described as changes and modifications may be made without departing from the scope of the invention.

I claim as follows:

1. A sealing assembly for a casing having a shaft extending outwardly through an end wall thereof, comprising packing surrounding said shaft outside of said end wall, an annular outer wall receiving said shaft outside of said packing to form an outer abutment therefor, an annular inner abutment wall having radially extending spring fingers engaging against the inner end of said packing to form an abutment therefor, the outer annular portions of said abutment walls being superposed, and clamping means receiving the outer portions of said outer and inner abutment walls for springing said walls together for initial axial compression of the packing, said spring fingers functioning after such initial compression of the packing to exert pressure thereagainst for taking up any wear in the packing and for keeping the packing in intimate sealing engagement with the shaft.

2. A sealing assembly for a casing having a shaft extending outwardly through an end wall thereof, comprising packing material surrounding the shaft outside of said end wall, an annular outer abutment wall receiving said shaft outside of said packing to form an abutment for the outer end of the packing, an annular inner resilient abutment wall receiving said shaft and having radially extending fingers for engaging against the inner end of the packing, said fingers having an initial axial deflection toward the packing, the outer peripheral portions of said abutment walls being superposed, a rigid abutment for said superposed portions, and clamping means clamping said superposed portions against said rigid abutment for causing said packing to be axially clamped between the outer wall and said fingers and for deflecting said fingers for pressure potential therein which will function against the packing to take up any wear thereof and to keep it in intimate sealing engagement with the shaft.

3. A sealing assembly for a casing having a shaft extending outwardly through an end wall thereof, comprising packing surrounding the shaft outside of said end wall, an annular spring disk seated at its outer portion against said end wall and having spring fingers adjacent the inner end of said packing, an outer annular wall receiving said shaft outside of said packing and forming an outer abutment for the packing, the outer portion of said outer wall being adapted to engage the outer portion of said disk, and clamping means for forcing said outer wall toward said end wall for clamping the outer portion of said disk to said end wall and whereby said packing will be axially clamped between said outer wall and the fingers on said disk and said fingers will be flexed and tensed to exert axial pressure against the packing to take up any wear thereof and to keep it in intimate engagement with the shaft.

GERVASE M. MAGRUM.